(12) United States Patent
Wang et al.

(10) Patent No.: US 12,197,709 B2
(45) Date of Patent: Jan. 14, 2025

(54) WORK DISPLAY METHOD AND APPARATUS, ELECTRONIC DEVICE, STORAGE MEDIUM, AND PROGRAM PRODUCT

(71) Applicant: Beijing Zitiao Network Technology Co., Ltd., Beijing (CN)

(72) Inventors: Tingting Wang, Beijing (CN); Jianqiang Liu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/753,246

(22) Filed: Jun. 25, 2024

(65) Prior Publication Data

US 2024/0345710 A1    Oct. 17, 2024

Related U.S. Application Data

(63) Continuation of application No. PCT/CN2023/080383, filed on Mar. 9, 2023.

(30) Foreign Application Priority Data

Mar. 15, 2022    (CN) .......................... 202210254536.0

(51) Int. Cl.
  *G06F 3/0481*    (2022.01)
  *G06F 3/0484*    (2022.01)
(52) U.S. Cl.
  CPC .......... *G06F 3/0484* (2013.01); *G06F 3/0481* (2013.01)
(58) Field of Classification Search
  None
  See application file for complete search history.

(56) References Cited

U.S. PATENT DOCUMENTS

2009/0150435 A1    6/2009  Balu et al.
2013/0007809 A1*   1/2013  Hays .................. H04N 21/8173
                                                            725/47
(Continued)

FOREIGN PATENT DOCUMENTS

CN    108920693 A    11/2018
CN    113891164 A    1/2022
(Continued)

OTHER PUBLICATIONS

"Exploration of UI Scene Design for Video Functionality," Red and Black, Available Online at https://zhuanlan.zhihu.com/p/375365844, Jun. 10, 2021, 19 pages.
(Continued)

*Primary Examiner* — Rinna Yi
(74) *Attorney, Agent, or Firm* — Alleman Hall & Tuttle LLP (57)    ABSTRACT

A display method of a work, an apparatus, an electronic device, a storage medium, and a program product are provided. The method includes: presenting a target work on a work presentation page; in response to a page switch operation triggering on the work presentation page, displaying a personal homepage of a target poster and displaying a position control on the personal homepage, wherein the target poster is a poster of the target work, and the personal homepage is configured to display work items of works posted by the target poster; and displaying a work item of the target work on the personal homepage in response to a first trigger operation triggering on the position control, wherein the position control keeps being displayed on the personal homepage before the work item of the target work is displayed.

14 Claims, 7 Drawing Sheets

(56) References Cited

U.S. PATENT DOCUMENTS

2015/0370456 A1* 12/2015 Kobayashi ............ G06F 3/0489
　　　　　　　　　　　　　　　　　　　　　　463/32
2024/0095814 A1*  3/2024 Kuno ...................... G09G 5/34

FOREIGN PATENT DOCUMENTS

| | | |
|---|---|---|
| CN | 113946271 A | 1/2022 |
| CN | 114036115 A | 2/2022 |
| CN | 114095670 A | 2/2022 |
| CN | 114168018 A | 3/2022 |
| CN | 114610431 A | 6/2022 |
| WO | 2020010816 A1 | 1/2020 |
| WO | 2022028239 A1 | 2/2022 |

OTHER PUBLICATIONS

"Tiktok—just seen it—improve the user's viewing experience," Half City Youth, Available Online at https://zhuanlan.zhihu.com/p/434025005, Nov. 16, 2021, 5 pages.

China National Intellectual Property Administration, Office Action and Search Report Issued in Application No. 202210254536.0, Mar. 2, 2023, 31 pages.

ISA China National Intellectual Property Administration, International Search Report Issued in Application No. PCT/CN2023/080383, Jun. 23, 2023, 12 pages. (Submitted with partial English translation).

* cited by examiner

| work ↲ —30 | dynamic state | have seen | collect |
|---|---|---|---|
| work item a-7 | work item a-6 | work item a-5 | |
| work item a-4 | work item a-3 | work item a-2 | |
| work item a-1 | work item of the target work | work item a+1 | |
| work item a+2 | work item a+3 | work item a+4 | |

| work | dynamic state | have seen | collect |
|---|---|---|---|
| work item a-7 | work item a-6 | work item a-5 |
| work item a-4 | work item a-3 | work item a-2 |
| work item a-1 | work item of the target work | work item a+1 |
| work item a+2 | work item a+3 | work item a+4 |

| work ↑ | dynamic state | have seen | collect |
|---|---|---|---|
| work item y | work item y+1 | work item y+2 | |
| work item y+3 | work item y+4 | work item y+5 | |
| work item y+6 | work item y+7 | work item y+8 | |
| work item y+9 | work item y+10 | work item y+11 | |

FIG. 8

WORK DISPLAY METHOD AND APPARATUS, ELECTRONIC DEVICE, STORAGE MEDIUM, AND PROGRAM PRODUCT

CROSS-REFERENCE TO RELATED APPLICATION

This application is a continuation of International Patent Application No. PCT/CN2023/080383, filed on Mar. 9, 2023, which claims the priority to and benefits of Chinese patent application No. 202210254536.0, filed on Mar. 15, 2022. All the aforementioned patent applications are hereby incorporated by reference in their entireties.

TECHNICAL FIELD

Embodiments of the present disclosure relate to the field of computer technology, for example, relate to a display method of a work, an apparatus, an electronic device, a storage medium, and a program product.

BACKGROUND

At present, when watching a video, the user may switch into a personal homepage of a poster of the video by executing a corresponding trigger operation, so as to view other works posted by the poster of the video.

However, after the user switches into the personal homepage of the poster, the user cannot quickly position the video the user has just watched, resulting in a poor user experience.

SUMMARY

Embodiments of the present disclosure provide a display method of a work, an apparatus, an electronic device, a storage medium, and a program product, to quickly position a video the user has just watched.

In the first aspect, the embodiments of the present disclosure provide a display method of a work, and the method comprises:

presenting a target work on a work presentation page;
in response to a page switch operation triggering on the work presentation page, displaying a personal homepage of a target poster and displaying a position control on the personal homepage, wherein the target poster is a poster of the target work, and the personal homepage is configured to display work items of works posted by the target poster; and
displaying a work item of the target work on the personal homepage in response to a first trigger operation triggering on the position control, wherein the position control keeps being displayed on the personal homepage before the work item of the target work is displayed.

In the second aspect, the embodiments of the present disclosure further provide a display apparatus of a work, and the apparatus comprises:

a work presenting module, configured to present a target work on a work presentation page;
a position control display module, configured to, in response to a page switch operation triggering on the work presentation page, display a personal homepage of a target poster, and display a position control on the personal homepage, wherein the target poster is a poster of the target work, and the personal homepage is configured to display work items of works posted by the target poster; and
a work item display module, configured to display a work item of the target work on the personal homepage in response to a first trigger operation triggering on the position control, wherein the position control keeps being displayed on the personal homepage before the work item of the target work is displayed.

In the third aspect, the embodiments of the present disclosure further provide an electronic device, and the electronic device comprises:

one or more processors; and
a memory storing one or more programs,
wherein the one or more programs are executed by the one or more processors, so that the one or more processors implement the display method of the work according to the embodiments of the present disclosure.

In the fourth aspect, the embodiments of the present disclosure further provide a computer-readable storage medium, wherein the computer-readable storage medium stores a computer program, and the computer program, when executed by a processor, implements the display method of the work according to the embodiments of the present disclosure.

In the fifth aspect, the embodiments of the present disclosure further provide a computer program product, wherein the computer program product, when executed by a computer, causes the computer to implement the display method of the work according to the embodiments of the present disclosure.

BRIEF DESCRIPTION OF DRAWINGS

The above and other features, advantages, and aspects of embodiments of the present disclosure will become more apparent by referring to the following detailed implementations taken in conjunction with the accompanying drawings. Throughout the drawings, the same or similar reference numerals indicate the same or similar elements. It should be understood that the drawings are schematic, and the components and elements are not necessarily drawn to scale.

DETAILED DESCRIPTION

Embodiments of the present disclosure will be described in more detail below with reference to the accompanying drawings. Although some embodiments of the present disclosure are illustrated in the drawings, it should be understood that the present disclosure can be embodied in various forms and should not be construed as limited to the embodiments set forth herein, but rather, these embodiments are provided for a more thorough and complete understanding of the present disclosure. It should be understood that the drawings and embodiments of the present disclosure are only used for exemplary functions.

It should be understood that the steps described in the method implementations of the present disclosure can be performed in different orders and in parallel. Furthermore, the method implementations may include additional steps and/or omit to perform the illustrated steps.

As used herein, the terms "comprising" and "including" and their variants are open-ended comprising, that is, "comprising but not limited to". The term "based on" is "at least partially based on". The term "an embodiment" means "at least one embodiment"; the term "another embodiment" means "at least one other embodiment"; the term "some embodiments" means "at least some embodiments". Related definitions of other terms will be given in the following description.

It should be noted that the concepts of "first" and "second" mentioned in this disclosure are only used for distinguishing different apparatus, modules, or units, and are not used for limiting the order or interdependence of the functions performed by these apparatus, modules, or units.

It should be noted that the modifications of "a", "one" and "a plurality of" mentioned in this disclosure are schematic rather than limiting, and those skilled in the art should understand that unless the context clearly indicates otherwise, they should be understood as "one or more".

Names of messages or information exchanged among multiple apparatus in the implementations of the present disclosure are only used for illustrative purposes.

Figure 1:
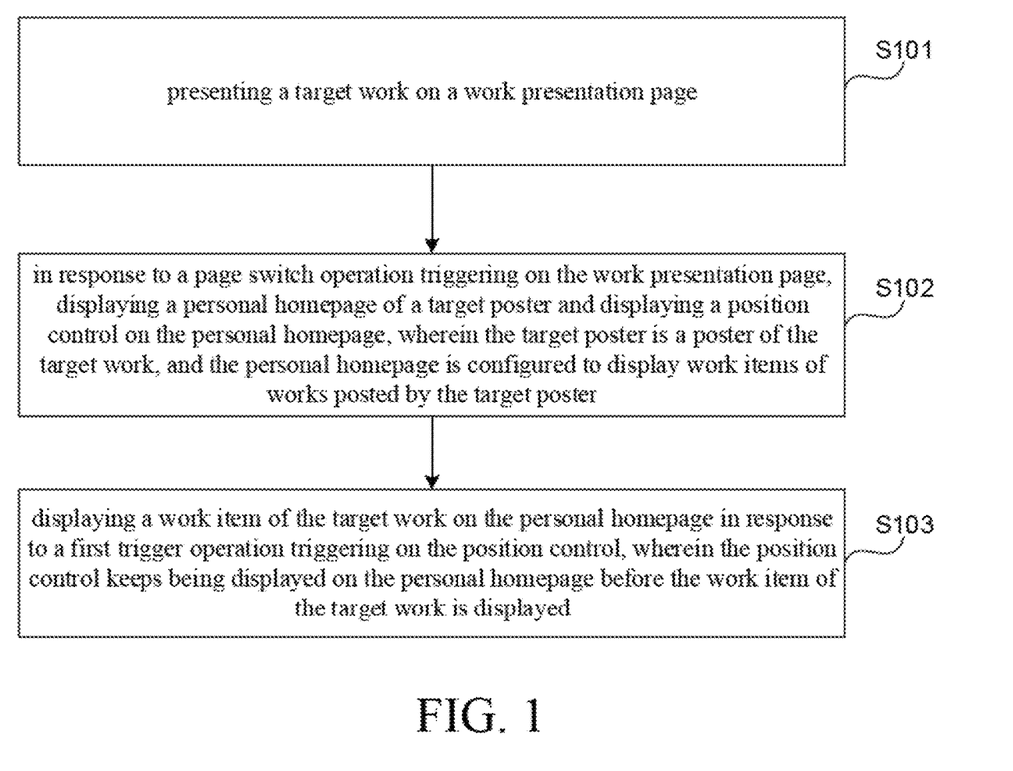
FIG. 1 is a schematic flow chart of a display method of a work provided by an embodiment of the present disclosure.

FIG. 1 is a schematic flow chart of a display method of a work provided by an embodiment of the present disclosure. The method may be executed by a display apparatus of a work. The apparatus may be implemented by software and/or hardware and may be configured in an electronic device, usually in a mobile phone or a tablet personal computer. The display method of the work provided by the embodiments of the present disclosure is suitable for scenarios where the work a user has just watched can be quickly positioned on a personal homepage. As shown in FIG. 1, the display method of the work provided by this embodiment may include following operations.

S101: presenting a target work on a work presentation page.

In this embodiment, the user may view the works on the work presentation page, for example, watch videos on a video play page, etc.

In this embodiment, the work presentation page may be understood as a page used for presenting a work, and the work may be, for example, an article or a video. Correspondingly, the target work may be understood as a work presented on the work presentation page. Exemplarily, the target work is a video played on the video play page when receiving a page switch operation. The video play page may be any video play page, or may also be a predetermined portion of the video play page, for example, the video play page used for playing recommended videos, etc.

S102: in response to the page switch operation triggering on the work presentation page, displaying a personal homepage of a target poster and displaying a position control on the personal homepage, wherein the target poster is a poster of the target work, and the personal homepage is configured to display work items of works posted by the target poster.

In this embodiment, the page switch operation may be understood as an operation of switching the work presentation page to the personal homepage of the target poster, for example, a trigger operation triggering on an avatar of the target poster displayed on the work presentation page. The target poster may be understood as a poster of the target work, for example, the poster whose avatar is triggered by the user.

The position control may be a control used for triggering positioning of the target work, that the user has just viewed, on the personal homepage, that is, the position control is set to be capable of instructing the electronic device to display the work item of the target work on the personal homepage. In this embodiment, a work item of a certain work (including the target work) may be understood as work information of the work, which may include a work cover of the work.

Figure 2:
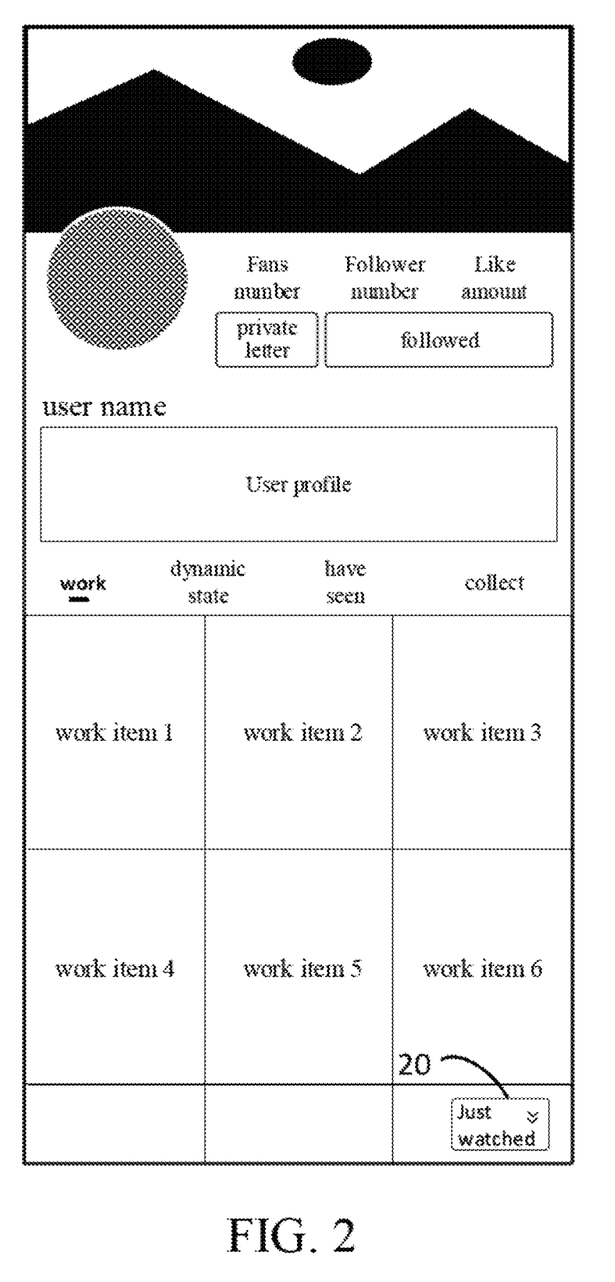
FIG. 2 is a schematic diagram of displaying a personal homepage provided by an embodiment of the present disclosure.

Optionally, the user may switch to enter the personal homepage of the target poster by executing the page switch operation. Taking that the work presentation page is the video play page as an example, when playing a work on the video play page, the electronic device displays the avatar of the poster of the work. Thus, when the user wants to view the personal homepage of the poster, the user triggers the avatar of the poster displayed on the video play page. Correspondingly, when detecting the user triggering the avatar of the poster displayed on the video play page, the electronic device confirms receipt of the page switch operation, switches the current page from the video play page to the personal homepage of the poster in response to the page switch operation, displays work information of at least some works posted by the poster on the personal homepage, and displays a position control 20 on the personal homepage, as shown in FIG. 2.

In one implementation, the electronic device may display the position control on the personal homepage without considering whether the work item of the target work is being displayed on the personal homepage at the current moment, until receiving a display cancel operation for the position control. In this case, the personal homepage may also set to display the position control in the case of not receiving the display cancel operation for the position control.

In this embodiment, the case of not receiving the display cancel operation for the position control may include a case of initially displaying the personal homepage, that is, the case where what is displayed on the personal homepage is a work item initially displayed thereby when switching to enter the personal homepage; or may also include a case of having switched the work item displayed on the personal homepage based on a slide operation of the user but not receiving the display cancel operation for the position control. Therefore, in the above-described implementations, the position control may be displayed on the personal homepage, whether in the case of initially switching to enter the personal homepage or in the case of having switched the work item displayed on the personal homepage based on the slide operation of the user, as long as the display cancel operation for the position control has not been received, so as to ensure that the user can quickly position the work he/she has just viewed by triggering the position control in any of the above-described cases.

Exemplarily, when receiving the page switch operation, the electronic device displays the personal homepage of the target poster, and directly displays the position control on the personal homepage without determining whether the work item of the target work is being displayed on the personal homepage at the current moment. When receiving any trigger operation triggering on the personal homepage, the electronic device determined whether the trigger operation is a display cancel operation; display of the position control is cancelled in response to the trigger operation being a display cancel operation; and the position control is kept on being displayed on the personal homepage in response to the trigger operation being not a display cancel operation. For example, the work item displayed on the personal homepage is switched based on the slide operation in response to the trigger operation being the slide operation, and the position control is kept being displayed.

In another implementation, by considering whether the work item of the target work is being displayed on the personal homepage at the current moment, the electronic device may display the position control on the personal homepage only in the case of not displaying the work item of the target work on the personal homepage and not receiving the display cancel operation for the position control. The electronic device temporarily does not display the position control on the personal homepage in the case where the work item of the target work is being displayed on the personal homepage even if not receiving the display cancel operation for the position control, so as to reduce the number of controls displayed on the personal homepage and improve practicality of the position control. In this case, the personal homepage may also set to display the position control in the case of not receiving the display cancel operation for the position control and not displaying the work item of the target work on the personal homepage.

In this embodiment, not displaying the work item of the target work on the personal homepage may be completely not displaying the work item of the target work on the personal homepage, that is, not displaying any content in the work item of the target work on the personal homepage; or may also be, for example, not completely displaying the work item of the target work on the personal homepage, in which case the user may view the work item of the target work completely by triggering the position control, to improve practicality of the position control.

Exemplarily, when receiving the page switch operation, the electronic device displays the personal homepage of the target poster, displays work items of at least some of the works posted by the target poster on the personal homepage, and determines whether there the work item of the target work is being displayed on the personal homepage at the current moment. The electronic device does not display the position control on the personal homepage when the work item of the target work is displayed on the personal homepage at the current moment, and displays the position control on the personal homepage when the work item of the target work is not displayed on the personal homepage at the current moment.

In this embodiment, before receiving the display cancel operation for the position control, the electronic device may display the position control on the personal homepage when the work item of the target work is not being displayed on the personal homepage, and may not display the position control on the personal homepage when the work item of the target work is being displayed on the personal homepage. In this case, optionally, the electronic device keeps displaying the position control on the personal homepage before displaying the work item of the target work; does not display the position control on the personal homepage when displaying the work item of the target work on the personal homepage; and redisplays the position control on the personal homepage after no longer displaying the work item of the target work and before redisplaying the work item of the target work.

Exemplarily, in response to receiving any trigger operation triggering on the personal homepage, the electronic device may determine whether the trigger operation is a display cancel operation for the position control. The electronic device no longer displays the position control on the personal homepage in response to the trigger operation being a display cancel operation for the position control, and displays the position control on the personal homepage in response to the trigger operation being not a display cancel operation for the position control and the work item of the target work being not displayed on the personal homepage.

Taking that the trigger operation is a slide operation (e.g., a vertical slide operation) triggering on the personal homepage for switching the work item displayed on the personal homepage as an example, the electronic device may switch the work item displayed on the personal homepage based on the slide operation each time it receives the slide operation, determine whether a position control is displayed on the personal homepage before switching and whether the work item of the target work is displayed on the personal homepage after switching, temporarily stops displaying the position control in response to the position control being displayed on the personal homepage before switching and the work item of the target work being displayed on the personal homepage after switching, and restore displaying the position control in response to receiving the slide operation again and the work item of the target work being not displayed on the personal homepage after switching; keep displaying the position control in response to the position control being displayed on the personal homepage before switching and the work item of the target work being not displayed on the personal homepage after switching; keep temporarily not displaying the position control in response to the position control being not displayed on the personal homepage before switching and the work item of the target work being displayed on the personal homepage after switching, and restore displaying the position control in response to receiving the slide operation again and the work item of the target work being not displayed on the personal homepage after switching; and display the position control on the personal homepage in response to the position control being not displayed on the personal homepage before switching and the work item of the target work being not displayed on the personal homepage after switching.

S103: displaying the work item of the target work on the personal homepage in response to a first trigger operation triggering on the position control, wherein the position control keeps being displayed on the personal homepage before the work item of the target work is displayed.

In this embodiment, the first trigger operation may be understood as a trigger operation triggering on the position control displayed on the personal homepage, for example, an operation of clicking on the position control.

In this embodiment, the user may not only sequentially switch between the respective work items displayed on the personal homepage by executing a slide operation to view the work item of the target work he/she has just viewed, but may also quickly view the work item of the target work he/she has just viewed by triggering the position control.

Optionally, when the user wants to view the work item of the target work, he/she may trigger the position control displayed on the personal homepage. Correspondingly, when detecting the user triggering the position control, the electronic device confirms receipt of the first trigger operation and controls, in response to the first trigger operation, movement of the respective work items displayed on the personal homepage along a direction corresponding to the positional relationships according to the positional relationships between the respective work items and the work item of the target work displayed on the personal homepage at the current moment, so as to move the work item of the target work into the personal homepage for display; or, acquires the work item of the target work as well as a plurality of work items located prior to and/or posterior to the work item of the target work, and displays the work item of the target work and the plurality of work items on the personal homepage.

In addition, when displaying the work item of the target work based on the first trigger operation, a corresponding animation effect may also be presented, for example, the work item is controlled continuously zooming in and zooming out multiple times, to facilitate the user to quickly determine the work item of the target work.

In this embodiment, once initially switching from the work presentation page to enter the personal homepage of the poster, the position control for positioning the work the user has just viewed on the work presentation page is displayed on the personal homepage, and the position control keeps being displayed on the personal homepage before displaying the work item of the target work. As compared with the technical solution of not displaying the position control on the personal homepage when initially displaying the personal homepage, and displaying the position control on the personal homepage after moving the top (e.g., the top 12) works displayed on the personal homepage out of the display region of the personal homepage based on the slide operation of the user or after receiving a set trigger operation of the user, the embodiments of the present disclosure allow the user to quickly position the work he/she has just viewed by triggering the position control once switching to enter the personal homepage, without executing any other additional operation such as the slide operation, which can simplify the operation required for the user to position the work he/she has just viewed, to quickly position the work the user has just viewed.

In one implementation, the display method of the work provided by this embodiment may further include: canceling display of the position control on the personal homepage in response to a display cancel operation for the position control. The display cancel operation includes at least one of the first trigger operation or a second trigger operation. The second trigger operation is a trigger operation triggering on any work item displayed on the personal homepage after the work item of the target work is displayed at least once.

In this embodiment, the display cancel operation may be an operation used for instructing the electronic device to no longer display the position control on the personal homepage. Instructing the electronic device to no longer display the position control on the personal homepage may be understood as instructing the electronic device to no longer display the position control on the personal homepage when displaying the personal homepage this time. In other words, when the user switches from the work presentation page to the personal homepage of the target poster or other poster again, the electronic device may redisplay the position control on the personal homepage, or redisplay the position control on the personal homepage in response to the work item of the corresponding work that has just been viewed not being displayed on the personal homepage before switching to enter the personal homepage.

It should be noted that, when receiving the display cancel operation, canceling display of the position control on the personal homepage may be understood as canceling display of the position control in the process of displaying the personal homepage this time, that is, no longer displaying the position control on the personal homepage in the process of displaying the personal homepage this time, whether the position control is being displayed on the personal homepage at the current moment or whether the work item of the target work is subsequently displayed on the personal homepage. Such case is different from the foregoing case of temporarily stopping display of the position control in response to the work item of the target work being displayed on the personal homepage, and restoring display of the position control in response to the work item of the target work being not displayed on the personal homepage.

The second trigger operation may be understood as an operation of triggering any work item displayed on the personal homepage after displaying the work item of the target work on the personal homepage. That is, before executing the second trigger operation, the work item of the target work has been displayed on the personal homepage at least once; and, when executing the second trigger operation, the work item of the target work may be displayed or may not be displayed on the personal homepage. The work item triggered by the second trigger operation may be the work item of the target work, or may also be other work items displayed on the personal homepage besides the work item of the target work.

In the above-described implementations, the user may instruct the electronic device to cancel display of the position control by triggering the position control or by triggering any work item displayed on the personal homepage after viewing the work item of the target work.

Exemplarily, when the user wants to quickly position the work item of the target work, he/she triggers the position control displayed on the personal homepage. Correspondingly, when detecting the user triggering the position control on the personal homepage, the electronic device displays the work item of the target work on the personal homepage and cancels display of the position control.

Or, when the user wants to view a work corresponding to a certain work item displayed on the personal homepage, he/she may trigger the work item. Correspondingly, when detecting the user triggering a certain work item displayed on the personal homepage, the electronic device determines whether the work item of the target work has been displayed during the process of displaying the personal homepage this time; the electronic device presents the work corresponding to the work item triggered by the user in response to the work item of the target work having been displayed during the process of displaying the personal homepage this time, and cancels display of the position control on the personal homepage; the electronic device presents the work corresponding to the work item triggered by the user and keeps displaying the position control in response to the work item of the target work having not been displayed during the process of displaying the personal homepage this time (for the case of the position control being displayed on the personal homepage when receiving the second trigger operation), or redisplays the position control on the personal homepage in response to the work item of the target work being not displayed on the personal homepage (for the case of the position control being temporarily not displayed on the personal homepage when receiving the second trigger operation). Presenting the work corresponding to the work item triggered by the user may be implemented through presenting a work presentation interface in an upper layer of the personal homepage, and presenting the work corresponding to the work item on the work presentation interface.

In the above-described implementations, display of the position control on the personal homepage is cancelled when the user triggers the position control or triggers any work item after viewing the work item of the target work, and display of the position control is kept when the work item of the target work is displayed on the personal homepage; or, display of the position control is temporarily stopped, and display of the position control is restored when the work item of the target work is moved out of the personal homepage. The position control will no longer be displayed when the work item of the target work is displayed on the personal homepage, that is, during the process of displaying the personal homepage this time. This may avoid the case where the position control disappears and no longer appears during the process of displaying the personal homepage this time as the user wants to view a work item of other work firstly or does not see the work item of the target work, which reduces probability of accidentally canceling display of the position control and improves user experience.

In this embodiment, after the user executes the page switch operation multiple times or after the user triggers the position control, the distance between the work item displayed on the personal homepage and the work item of the preset work posted by the target poster may be relatively great, and at this time, operation costs for the user to view the preset work item is high; and therefore, in order to simplify operations of the user, the display method of the work provided by this embodiment may further include: displaying a return control on the personal homepage when a preset display condition is met, wherein the return control is set to trigger display of the work item of the preset work posted by the target poster.

In this embodiment, the preset work and the preset display condition may be set as needed. For example, the preset work may be a work corresponding to the 1st work item on the personal homepage. It may be understood that the 1st work item on the personal homepage may have different meanings from the first work item displayed on the personal homepage at the current moment; for example, the respective works posted by the target poster may be sorted according to a preset sorting rule, and the work items of the respective works may be presented on the personal homepage according to the sort result, in this case, the 1st work item on the personal homepage may be a work item of the 1st work sorted, the first work item displayed on the personal homepage at the current moment may be the first work item among the respective work items displayed in a display region of the personal homepage at the current moment.

The preset display condition may be the work item of the preset work being not displayed on the personal homepage, or, work items of the preset work and a plurality of works prior to and/or posterior to the preset work being not displayed on the personal homepage, etc. Taking that the preset work is the work corresponding to the 1st work item on the personal homepage as an example, the preset display condition may be the 1st work item being not displayed on the personal homepage, or a plurality of (e.g., 20) consecutive work items located posterior to the 1st work item and closest to the 1st work item all being not displayed on the personal homepage.

Figure 3:
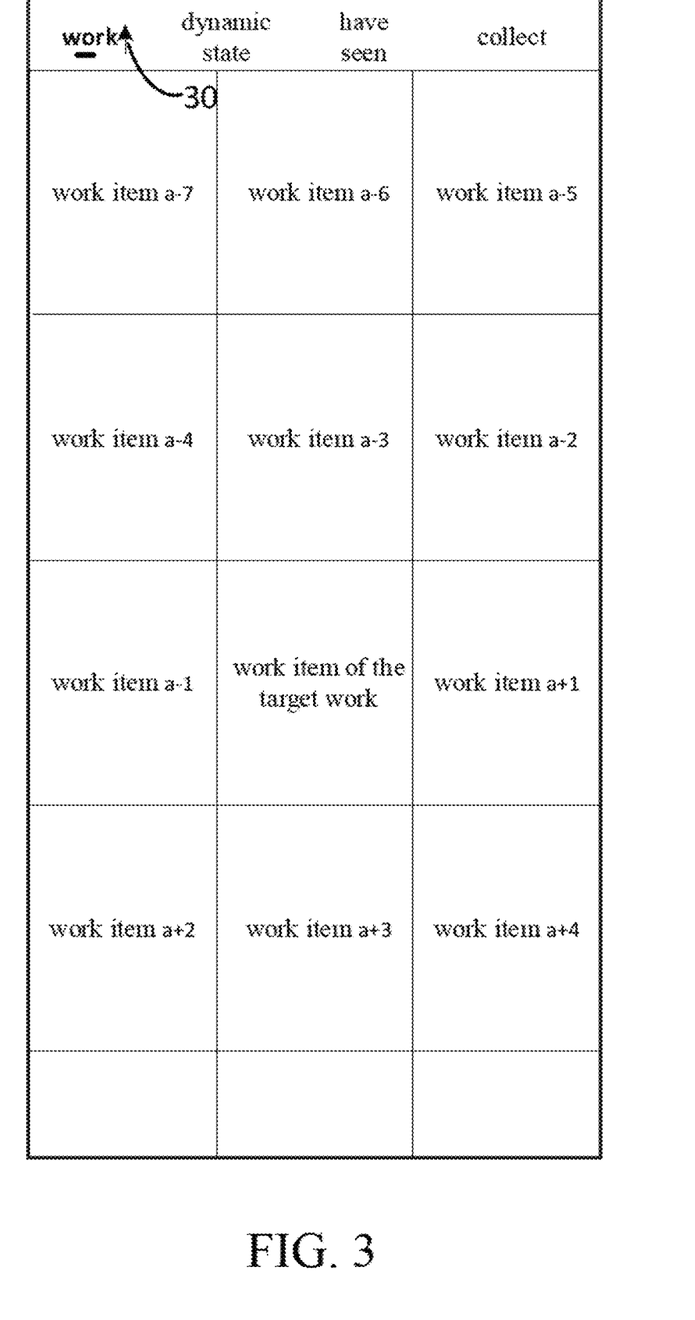
FIG. 3 is a schematic diagram of displaying a personal homepage provided by an embodiment of the present disclosure.

Exemplarily, as shown in FIG. 3, when the preset display condition is met, the electronic device displays a return control 30 on the personal homepage. Thus, when the user wants to view the work item of the preset work, he/she may trigger the return control 30. Correspondingly, when detecting the user triggering the return control 30, the electronic device may display the work item of the preset work posted by the target poster on the personal homepage, for example, control the respective work items displayed on the personal homepage moving downwards synchronously, to return to displaying the 1st work item on the personal homepage (as shown in FIG. 2).

The display method of the work provided by this embodiment includes: presenting the target work on the work presentation page; in response to the page switch operation triggering on the work presentation page, displaying the personal homepage of the target poster and displaying the position control on the personal homepage, wherein the target poster is the poster of the target work, and the personal homepage is configured to display the work item of the work posted by the target poster; and displaying the work item of the target work on the personal homepage in response to the first trigger operation triggering on the position control, wherein the position control keeps being displayed on the personal homepage before the work item of the target work is displayed. This embodiment adopts the above-described technical solution to keep displaying the position control on the personal homepage before displaying the work item of the work that has just been viewed, which may simplify the operation required for the user to position the work he/she has just viewed, to quickly position the work the user has just viewed.

Figure 4:
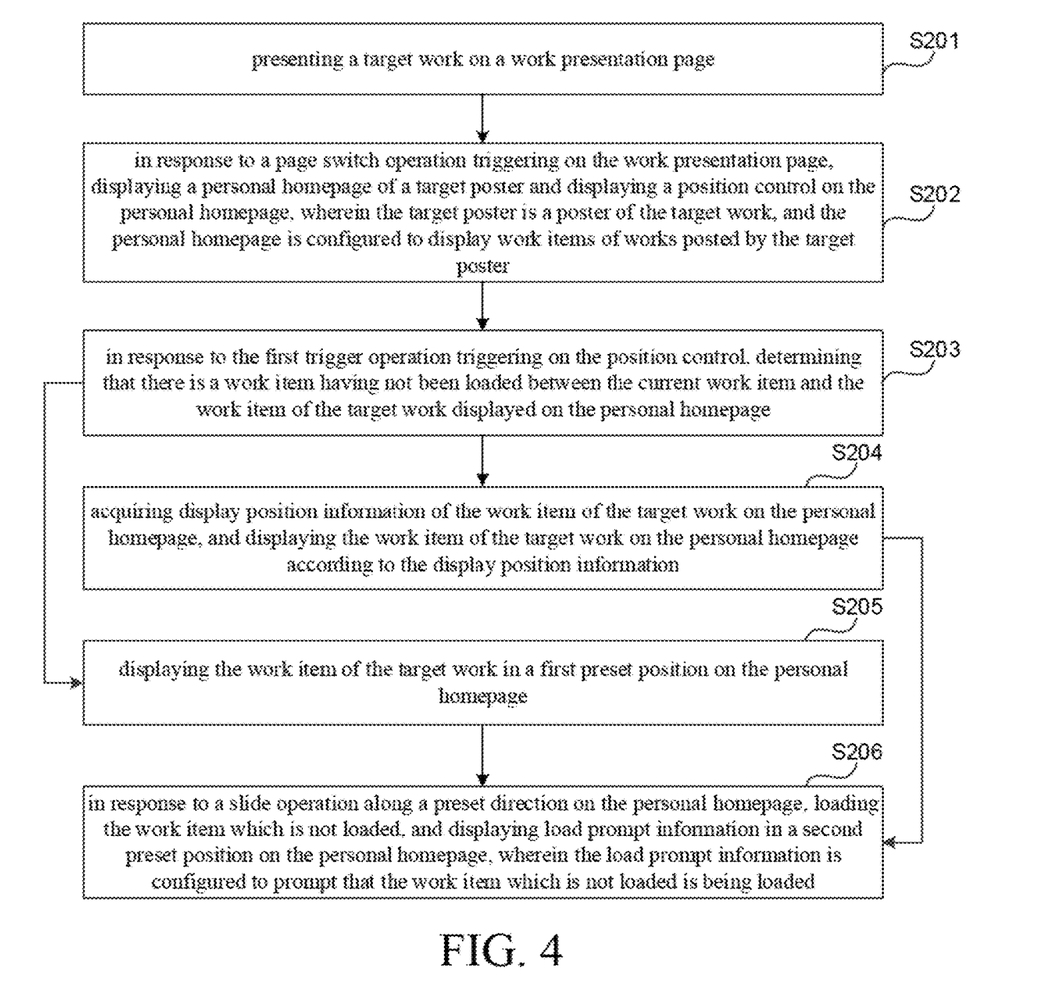
FIG. 4 is a schematic flow chart of a display method of a work provided by an embodiment of the present disclosure.

FIG. 4 is a schematic flow chart of another display method of a work provided by an embodiment of the present disclosure. The solution in this embodiment may be combined with one or more optional solutions in the above-described embodiments. Optionally, the display method of the work provided by the embodiments further includes that: displaying the work item of the target work on the personal homepage includes: acquiring display position information of the work item of the target work on the personal homepage, and displaying the work item of the target work on the personal homepage according to the display position information; or, displaying the work item of the target work in a first preset position on the personal homepage.

Optionally, before displaying the work item of the target work on the personal homepage, the method further includes: determining that there is a work item having not been loaded between the current work item and the work item of the target work displayed on the personal homepage.

Optionally, after displaying the work item of the target work on the personal homepage, the method further includes: in response to a slide operation along a preset direction on the personal homepage, loading the work item having not been loaded, and displaying load prompt information in a second preset position on the personal homepage. The load prompt information is set to prompt that the work item having not been loaded is being loaded.

Correspondingly, as shown in FIG. 4, the display method of the work provided by this embodiment may include following operations.

S201: presenting the target work on the work presentation page.

S202: in response to the page switch operation triggering on the work presentation page, displaying the personal homepage of the target poster, and displaying a position control on the personal homepage, wherein the target poster is a poster of the target work, and the personal homepage is configured to display the work item of the work posted by the target poster.

S203: in response to the first trigger operation triggering on the position control, determining that there is a work item having not been loaded between the current work item and the work item of the target work displayed on the personal homepage, and executing S204 or S205.

In this embodiment, when switching from the work presentation page to the personal homepage, the top m (m being a positive integer) work items on the personal homepage and the work item of the target work, as well as work data corresponding to the respective work items, may be pre-loaded, to improve the response speed when the user is viewing the corresponding work item and/or work. For example, when the work item of the target work is located within the top m work items on the personal homepage, the top m work items on the personal homepage and the work data corresponding to the respective work items may be acquired from the server; when the work item of the target work is located out of the top m work items on the personal homepage, the top m work items, the target work item, and a plurality of consecutive work items prior to and posterior to the target work item, as well as the work data corresponding the respective work items may be acquired from the server; and the display position information of the work item of the target work on the personal homepage or sort information (e.g., rank) of the target work among the respective works posted by the target poster may also be acquired from the server, where, m may be set as needed, for example, m may be set to 200.

It may be understood that the electronic device may also load only the work items that need to be displayed when displaying the personal homepage, without loading the work data corresponding to the respective work items; for example, may further load the work data corresponding to the work item when receiving a trigger operation for a certain work item.

Exemplarily, when receiving the first trigger operation triggering on the position control, the electronic device may determine whether there is any work item having not been loaded between the currently displayed work item (i.e., the current work item) and the work item of the target work on the personal homepage, that is, determine whether the respective work items between the current work item and the work item of the target work as well as work data corresponding thereto have all been loaded; execute S204 or S205 in response to the respective work items between the current work item and the work item of the target work as well as work data corresponding thereto having all been loaded; in response to at least one of the respective work items between the current work item and the work item of the target work as well as work data corresponding thereto having not been loaded completely, control the respective work items between the current work item and the work item of the target work on the personal homepage moving along a direction from the work item of the target work towards the current work item, so as to display the work item of the target work on the personal homepage.

In this embodiment, when the rank of the work item of the target work is relatively low, for example, when the work item of the target work is located out of the top m work items on the personal homepage, the position control may still be displayed to quickly position the target work when the user triggers the position control. As compared with the technical solution of loading the target work and all work items prior thereto and displaying the position control only when the work item of the target work is located within the top m work items on the personal homepage, and not displaying the position control when the work item of the target work is located out of the top m work items on the personal homepage, the technical solution in this embodiment can solve, without loading all work items prior to the work item of the target work and work data corresponding thereto, the problem of failure to position quickly when the rank of the target work is lower than a certain number, so as to further improve user experience.

In addition, after the user views the work item of the target work by triggering the position control, and returns to view the work item of the preset work by triggering the return control, if there are work items having not been loaded between the work item of the preset work and the work item of the target work, the loaded target work item and the loaded work items consecutive with the target work item, as well as the work data of the corresponding work items may be further deleted, meanwhile displaying the work item of the preset work on the personal homepage, so as to reduce memory occupation of the electronic device.

S204: acquiring the display position information of the work item of the target work on the personal homepage, and displaying the work item of the target work on the personal homepage according to the display position information, and executing S206.

In this embodiment, the display position information may be column identifier information when the work item of the target work is displayed on the personal homepage. As shown in FIG. 3, a main display region of the personal homepage may have a plurality of rows and a plurality of columns (e.g., a left column, a middle column, and a right column) of work items simultaneously displayed; the display position information may be used for indicating the column in which the work item of the target work is displayed on the personal homepage. The column identifier information may be determined by the server or the electronic device according to the sort information of the target work among the respective works posted by the target poster. The row number identifier information when displaying the work item of the target work may be preset, for example, the work item of the target work may be set to be displayed in a certain row closest to a midpoint of the main display region of the personal homepage, and so on.

Optionally, when receiving the first trigger operation, the electronic device may acquire the display position information of the work item of the target work on the personal homepage, and display the work item of the target work in a display position corresponding to the display position information, as well as a plurality of work items located prior to and posterior to the work item of the target work.

S205: displaying the work item of the target work in the first preset position on the personal homepage.

In this embodiment, the first preset position may be understood as a default display position of the work item of the target work, for example, row identifier information and column identifier information when displaying the work item of the target work on the personal homepage, which may be preset by a developer.

Optionally, when receiving the first trigger operation, the electronic device may directly display the work item of the target work in the first preset position on the personal homepage, as well as a plurality of work items located prior to and posterior to the work item of the target work.

In this embodiment, when there is a work item having not been loaded between the current work item and the work item of the target work on the personal homepage, the work item of the target work may be displayed based on the display position information of the work item of the target work on the personal homepage, or the work item of the target work may be directly displayed in the first preset position; or, when the work item of the target work is a certain work item among the m-th work item to the n-th work item on the personal homepage, the work item of the target work may be displayed based on the display position information of the work item of the target work on the personal homepage; and when the work item of the target work is not a work item among the m-th work item to the n-th work item on the personal homepage, the work item of the target work may be directly displayed in the first preset position, to reduce computational load on the server/the electronic device while improving the display effect of the work item of the target work, where, n is a positive integer, n>m, and specific values of m and n may be set as needed, for example, m may be set to 200, and n may be set to 1000.

S206: in response to a slide operation along a preset direction on the personal homepage, loading the work item having not been loaded, and displaying load prompt information in a second preset position on the personal homepage, wherein the load prompt information is set to prompt that the work item having not been loaded is being loaded.

In this embodiment, the slide operation may be an operation of switching between the work items displayed on the personal homepage, for example, a vertical slide operation triggering on the personal homepage. The slide operation along the preset direction may be an operation of displaying the above-described work item having not been loaded on the personal homepage, that is, an operation of viewing the work item having not been loaded and located prior to the work item of the target work, for example, an operation of sliding downwards on the personal homepage. The second preset position may be a position corresponding to an appearance position of the work item having not been loaded, for example, the top of the personal homepage.

Figure 5:
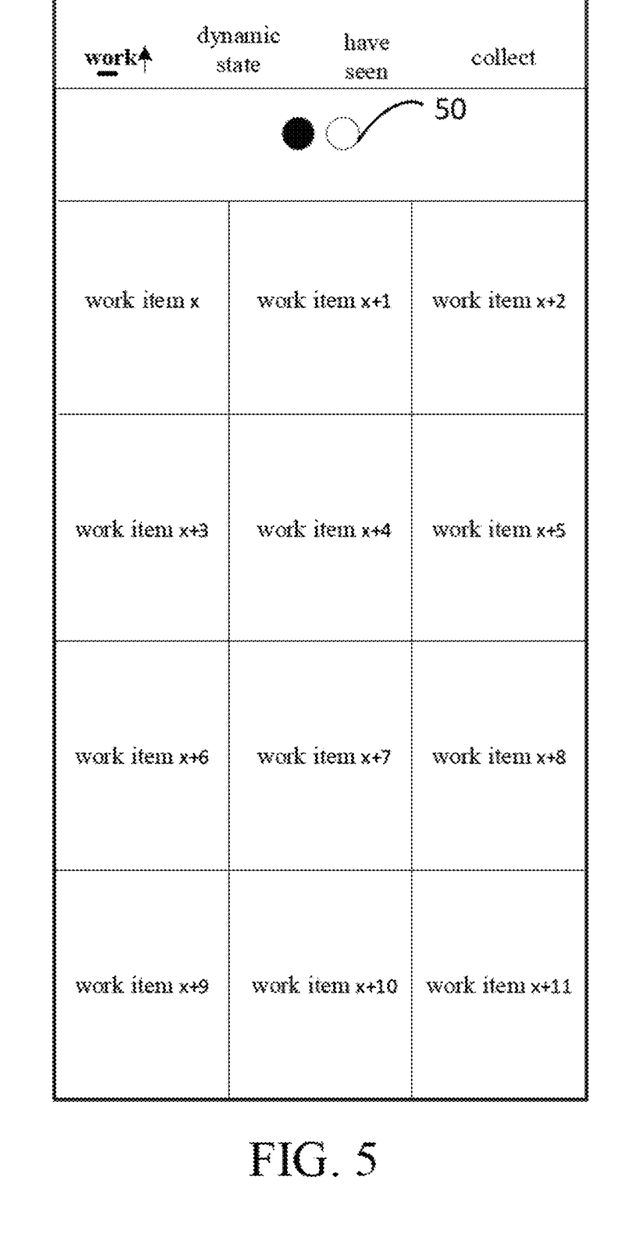
FIG. 5 is a schematic diagram of displaying load prompt information provided by an embodiment of the present disclosure.

Taking that the slide operation along the preset direction is an operation of sliding downwards as an example, the user may slide downwards when he/she wants to view a work item located prior to the work item of the target work. Correspondingly, when detecting the user sliding downwards, the electronic device may confirm receipt of the slide operation along the preset direction, acquires the work item to be displayed and having not been loaded as well as work data thereof from the server, and displays the load prompt information 50 at the top of the personal homepage during the acquisition process to prompt the user that the work item he/she wants to view is being loaded, as shown in FIG. 5.

Figure 6:
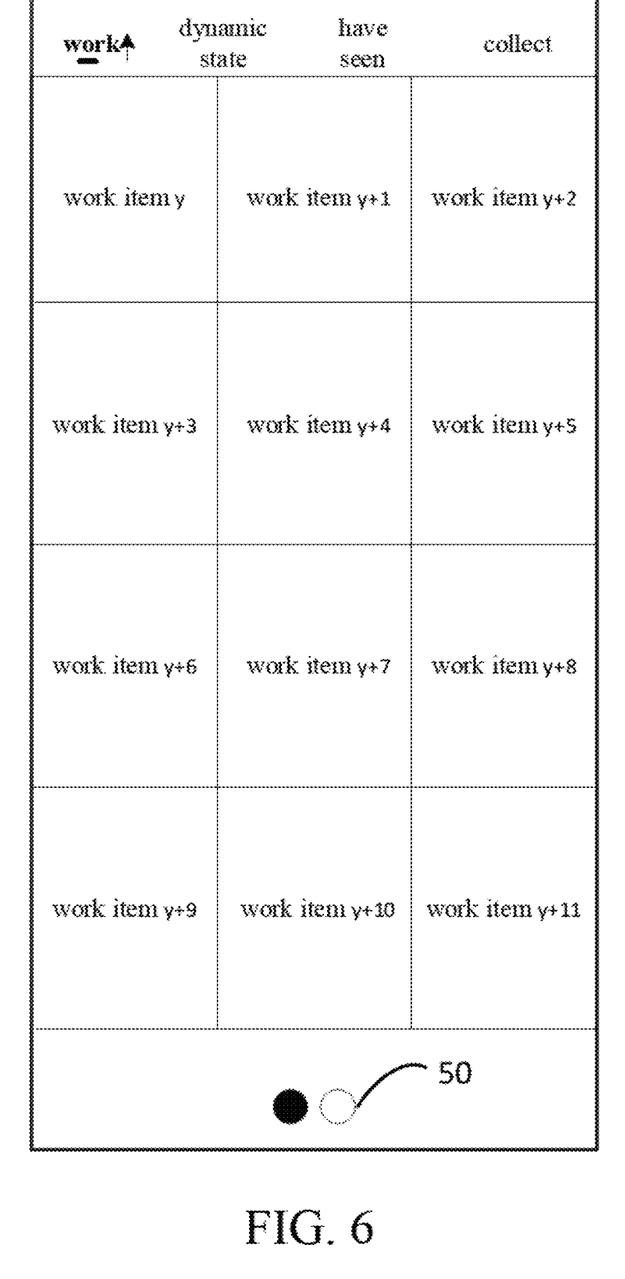
FIG. 6 is a schematic diagram of displaying load prompt information provided by an embodiment of the present disclosure.

In addition, when the user wants to view the work item located posterior to the target work, he/she may slide upwards. Correspondingly, when detecting the user sliding upwards, the electronic device may acquire the work item to be displayed and having not been loaded as well as work data thereof from the server, and display the load prompt information 50 at the bottom of the personal homepage during the acquisition process to prompt the user that the work item he/she wants to view is being loaded, as shown in FIG. 6.

In the display method of the work provided by this embodiment, when the first trigger operation is received, different modes are adopted to display the work item of the target work, and the load prompt information is displayed in a corresponding position when the preset work switch operation is received, which can meet different display needs and improve user experience.

Figure 7:
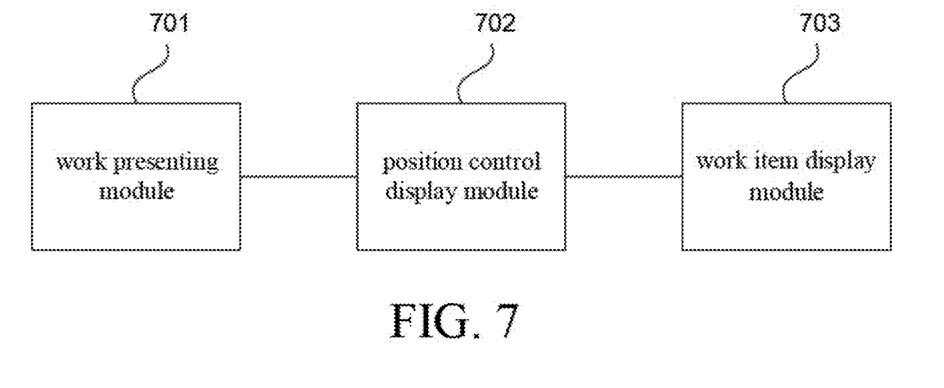
FIG. 7 is a structural block diagram of a display apparatus of a work provided by an embodiment of the present disclosure.

FIG. 7 is a structural block diagram of a display apparatus of a work provided by an embodiment of the present disclosure. The apparatus may be implemented by software and/or hardware, may be configured in an electronic device, may be configured in a mobile phone or a tablet personal computer, and may execute the display method of the work to quickly display the work the user has just viewed. As shown in FIG. 7, the display apparatus of the work provided by this embodiment may include: a work presenting module 701, a position control display module 702, and a work item display module 703.

The work presenting module 701 is configured to present a target work on a work presentation page.

The position control display module 702 is configured to, in response to a page switch operation triggering on the work presentation page, display a personal homepage of a target poster, and display a position control on the personal homepage. The target poster is a poster of the target work, and the personal homepage is set to display work items of works posted by the target poster.

The work item display module 703 is configured to display a work item of the target work on the personal homepage in response to a first trigger operation triggering on the position control. The position control keeps being displayed on the personal homepage before the work item of the target work is displayed.

In the display apparatus of the work provided by this embodiment, the work presenting module presents the target work on the work presentation page; the position control display module, in response to the page switch operation triggering on the work presentation page, displays the personal homepage of the target poster, and display the position control on the personal homepage, wherein, the target poster is a poster of the target work, and the personal homepage is set to display the work items of the works posted by the target poster; and the work item display module displays the work item of the target work on the personal homepage in response to the first trigger operation triggering on the position control, wherein the position control keeps being displayed on the personal homepage before the work item of the target work is displayed. This embodiment adopts the above-described technical solution to keep displaying the position control on the personal homepage before displaying the work item of the work that has just been viewed, which may simplify the operation required for the user to position the work he/she has just viewed, to quickly position the work the user has just viewed.

In the above-described technical solutions, the personal homepage may further be set to display the position control in response to not receiving a display cancel operation for the position control.

In the above-described technical solutions, the personal homepage may also be set to display the position control in response to not receiving the display cancel operation for the position control and not displaying the work item of the target work on the personal homepage.

Optionally, the position control may not be displayed on the personal homepage in response to the work item of the target work being displayed on the personal homepage; and the position control may be redisplayed on the personal homepage after no long displaying the work item of the target work and before redisplaying the work item of the target work.

Optionally, the display apparatus of the work provided by this embodiment may further include: a display cancel module, configured to cancel display of the position control on the personal homepage in response to a display cancel operation for the position control. The display cancel operation includes at least one of the first trigger operation or a second trigger operation. The second trigger operation is a trigger operation triggering on any work item displayed on the personal homepage after the work item of the target work is displayed at least once.

Optionally, the display apparatus of the work provided by this embodiment may further include: a return control display module, configured to display a return control on the personal homepage in response to meeting a preset display condition. The return control is set to trigger display of the work item of the preset work posted by the target poster.

In the above-described technical solutions, the work item display module 703 may be configured to display the work item of the target work on the personal homepage in the mode below: acquiring display position information of the work item of the target work on the personal homepage, and displaying the work item of the target work on the personal homepage according to the display position information; or, displaying the work item of the target work in the first preset position on the personal homepage.

Optionally, the display apparatus of the work provided by this embodiment may further include a determining module, which is configured to determine that there is an work item having not been loaded between the current work item and the work item of the target work displayed on the personal homepage before displaying the work item of the target work on the personal homepage.

Optionally, the display apparatus of the work provided by this embodiment may further include: a loading module, configured to loading the work item having not been loaded in response to a slide operation along a preset direction on the personal homepage after displaying the work item of the target work on the personal homepage, and displaying load prompt information in a second preset position on the personal homepage. The load prompt information is set to prompt that the work item having not been loaded is being loaded.

The display apparatus of the work provided by the embodiments of the present disclosure can execute the display method of the work provided by any embodiment of the present disclosure, and has corresponding functional modules and advantageous effects for executing the display method of the work. The display method of the work provided by any embodiment of the present disclosure may be referred to for the technical details not described in detail in this embodiment.

Figure 8:
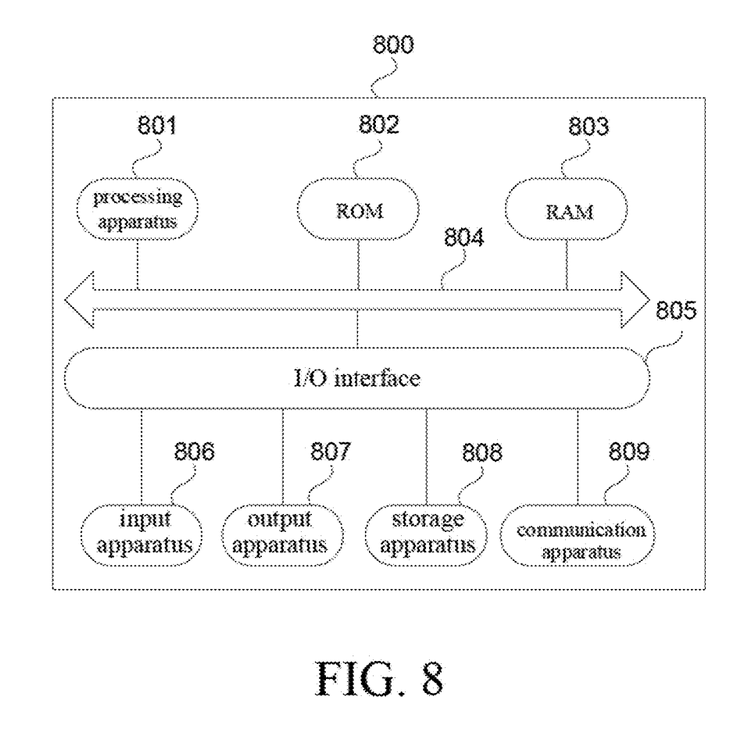
FIG. 8 is a structural schematic diagram of an electronic device provided by an embodiment of the present disclosure.

Referring to FIG. 8, it illustrates a structural schematic diagram suitable for implementing an electronic device 600 (e.g., a terminal device) in the embodiments of the present disclosure. The terminal device of the embodiments of the present disclosure may include mobile terminals such as mobile phones, notebook computers, digital broadcast receivers, personal digital assistant (PDA), tablet computer (PAD), portable multimedia player (PMP), vehicle-mounted terminals (such as vehicle-mounted navigation terminals) and the like, and fixed terminals such as digital TV (television), desktop computers and the like. The electronic device illustrated in FIG. 8 is just an example.

As illustrated in FIG. 8, the electronic device 800 may include a processing apparatus (e.g., a central processing unit, a graphics processor, etc.) 801, which may perform various appropriate actions and processes according to a program stored in a read-only memory (ROM) 802 or a program loaded from a storage apparatus 808 to a random access memory (RAM) 803. In the RAM 803, various programs and data required for the operation of the electronic device 800 are also stored. The processing apparatus 801, the ROM 802, and the RAM 803 are connected to each other by a bus 804. An input/output (I/O) interface 805 is also connected to the bus 804.

Generally, the following apparatus may be connected to the I/O interface 805: an input apparatus 806 including, for example, a touch screen, a touchpad, a keyboard, a mouse, a camera, a microphone, an accelerometer, a gyroscope, etc.; an output apparatus 807 including, for example, a liquid crystal display (LCD), a speaker, a vibrator, etc.; a storage apparatus 808 including, for example, a magnetic tape, a hard disk, etc.; and a communication apparatus 809. The communication apparatus 809 may allow the electronic device 800 to perform wireless or wired communication with other devices to exchange data. Although FIG. 8 illustrates an electronic device 800 with various apparatus, it should be understood that it is not required to implement or have all the apparatuses shown, more or fewer apparatus may alternatively be implemented or provided.

In particular, according to the embodiments of the present disclosure, the process described above with reference to the flowchart may be implemented as a computer software program. For example, the embodiments of the present disclosure include a computer program product including a computer program carried on a non-transitory computer-readable medium, which contains program code for executing the method shown in the flowchart. In such an embodiment, the computer program can be downloaded and installed from the network by the communication apparatus 809, or installed from the storage apparatus 808, or installed from the ROM 802. When the computer program is executed by the processing apparatus 801, the above functions defined in the method of the embodiments of the present disclosure are performed.

It should be noted that the computer-readable medium mentioned above in this disclosure can be a computer-readable signal medium or a computer-readable storage medium or any combination of the two. The computer-readable storage medium can be, for example, but not limited to, an electrical, magnetic, optical, electromagnetic, infrared, or semiconductor system, apparatus or device, or a combination of any of the above. More specific examples of computer-readable storage media may include an electrical connection with one or more wires, a portable computer disk, a hard disk, a random access memory (RAM), a read-only memory (ROM), a erasable programmable read-only memory (EPROM or flash memory), an optical fiber, a portable compact disk read-only memory (CD-ROM), an optical storage device, a magnetic storage device, or any suitable combination of the above. In this disclosure, the computer-readable storage medium may be any tangible medium containing or storing a program, which can be used by or in combination with an instruction execution system, apparatus, or device. In this disclosure, the computer-readable signal medium may include a data signal propagated in a baseband or as part of a carrier wave, in which computer-readable program codes are carried. This propagated data signal can take many forms, including electromagnetic signals, optical signals, or any suitable combination of the above. The computer-readable signal medium can also be any computer-readable medium other than a computer-readable storage medium, which can send, propagate, or transmit a program for use by or in connection with an instruction execution system, apparatus, or device. The program code contained in the computer-readable medium may be transmitted through any suitable medium, including wires, optical cables, radio frequency (RF), and the like, or any suitable combination of the above.

In some embodiments, the client and the server can communicate by using any currently known or future-developed network protocol such as HyperText transfer protocol (HTTP) and can be interconnected with digital data communication in any form or medium (for example, communication network). Examples of communication networks include a local area network (LAN), a wide area network (WAN), Internetworking (for example, the Internet), and end-to-end networks (for example, ad hoc end-to-end networks), as well as any currently known or future-developed networks.

The computer-readable medium may be included in the electronic device, and it may exist alone without being assembled into the electronic device.

The computer-readable medium carries one or more programs that, when executed by the electronic device, cause the electronic device to: present a target work on a work presentation page; in response to a page switch operation triggering on the work presentation page, display a personal homepage of a target poster and display a position control on the personal homepage, wherein the target poster is a poster of the target work, and the personal homepage is configured to display work items of works posted by the target poster; and display a work item of the target work on the personal homepage in response to a first trigger operation triggering on the position control, wherein the position control keeps being displayed on the personal homepage before the work item of the target work is displayed.

Computer program codes for performing the operations of the present disclosure may be written in one or more programming languages or their combinations, including object-oriented programming languages, such as Java, Smalltalk, C++, and conventional procedural programming languages, such as "C" language or similar programming languages. The program code can be completely executed on the user's computer, partially executed on the user's computer, executed as an independent software package, partially executed on the user's computer and partially executed on a remote computer, or completely executed on a remote computer or server. In the case involving a remote computer, the remote computer may be connected to a user computer by any kind of network, including a local area network (LAN) or a wide area network (WAN), or may be connected to an external computer (for example, by the Internet using an Internet service provider).

The flowcharts and block diagrams in the drawings illustrate the architecture, functions, and operations of possible implementations of systems, methods, and computer program products according to various embodiments of the present disclosure. In this regard, each block in the flowchart or block diagram may represent a module, a program segment, or a part of code that contains one or more executable instructions for implementing specified logical functions. It should also be noted that in some alternative implementations, the functions noted in the blocks may occur in a different order than those noted in the drawings. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

The units involved in the embodiments described in the present disclosure may be implemented by the manner of software and may also be implemented by the manner of hardware. Among them, the name of the unit does not constitute the limitation of the unit itself in some cases.

The functions described above herein may be at least partially performed by one or more hardware logic components. For example, exemplary types of hardware logic components that can be used include field programmable gate array (FPGA), application specific integrated circuit (ASIC), application specific standard product (ASSP), system on chip (SOC), complex programmable logic device (CPLD), and so on.

In the context of this disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include an electronic, magnetic, optical, electromagnetic, infrared, or semiconductor system, apparatus or device, or any suitable combination of the above. The machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a convenient compact disk read-only memory (CD-ROM), an optical storage device, a magnetic storage device, or any suitable combination of the above.

According to one or more embodiments of the present disclosure, example 1 provides a display method of a work, comprising:
    presenting a target work on a work presentation page;
    in response to a page switch operation triggering on the work presentation page, displaying a personal homepage of a target poster and displaying a position control on the personal homepage, wherein the target poster is a poster of the target work, and the personal homepage is configured to display work items of works posted by the target poster; and
    displaying a work item of the target work on the personal homepage in response to a first trigger operation triggering on the position control, wherein the position control keeps being displayed on the personal homepage before the work item of the target work is displayed.

According to one or more embodiments of the present disclosure, in the method of example 2 according to example 1, the personal homepage is further configured to display the position control in response to not receiving a display cancel operation for the position control.

According to one or more embodiments of the present disclosure, in the method of example 3 according to example 1, the personal homepage is further configured to display the position control in response to not receiving a display cancel operation for the position control and not displaying the work item of the target work on the personal homepage.

According to one or more embodiments of the present disclosure, in the method of example 4 according to example 3, the position control is not displayed on the personal homepage when the work item of the target work is displayed on the personal homepage; and the position control is redisplayed on the personal homepage after no longer displaying the work item of the target work and before displaying the work item of the target work again.

According to one or more embodiments of the present disclosure, the method of example 5 according to any one of examples 2-4, further comprising:

canceling display of the position control on the personal homepage in response to the display cancel operation for the position control, wherein the display cancel operation comprises at least one of the first trigger operation or a second trigger operation, and the second trigger operation is a trigger operation triggering on any work item displayed on the personal homepage after the work item of the target work is displayed at least once.

According to one or more embodiments of the present disclosure, the method of example 6 according to any one of examples 1-4, further comprising:
displaying a return control on the personal homepage when a preset display condition is met, wherein the return control is configured to trigger display of a work item of a preset work posted by the target poster.

According to one or more embodiments of the present disclosure, in the method of example 7 according to any one of examples 1-4, displaying the work item of the target work on the personal homepage comprises:
acquiring display position information of the work item of the target work on the personal homepage, and displaying the work item of the target work on the personal homepage according to the display position information; or
displaying the work item of the target work in a first preset position on the personal homepage.

According to one or more embodiments of the present disclosure, in the method of example 8 according to example 7, before displaying the work item of the target work on the personal homepage, the method further comprises:
determining that there is a work item which is not loaded between a current work item and the work item of the target work displayed on the personal homepage.

According to one or more embodiments of the present disclosure, in the method of example 9 according to example 8, the method further comprises:
in response to a slide operation along a preset direction on the personal homepage, loading the work item which is not loaded, and displaying load prompt information in a second preset position on the personal homepage, wherein the load prompt information is configured to prompt that the work item which is not loaded is being loaded.

According to one or more embodiments of the present disclosure, example 10 provides a display apparatus of a work, comprising:
a work presenting module, configured to present a target work on a work presentation page;
a position control display module, configured to, in response to a page switch operation triggering on the work presentation page, display a personal homepage of a target poster, and display a position control on the personal homepage, wherein the target poster is a poster of the target work, and the personal homepage is configured to display work items of works posted by the target poster; and
a work item display module, configured to display a work item of the target work on the personal homepage in response to a first trigger operation triggering on the position control, wherein the position control keeps being displayed on the personal homepage before the work item of the target work is displayed.

According to one or more embodiments of the present disclosure, example 11 provides an electronic device, comprising:
one or more processors; and
a memory storing one or more programs,
wherein the one or more programs are executed by the one or more processors, so that the one or more processors implement the display method of the work according to any one of examples 1-9.

According to one or more embodiments of the present disclosure, example 12 provides a computer-readable storage medium, wherein the computer-readable storage medium stores a computer program, and the computer program, when executed by a processor, implements the display method of the work according to any one of examples 1-9.

According to one or more embodiments of the present disclosure, example 13 provides a computer program product, wherein the computer program product, when executed by a computer, causes the computer to implement the display method of the work according to any one of examples 1-9.

The invention claimed is:

1. A display method of a work, comprising:
presenting a target work on a work presentation page displayed on a display of an electronic device;
in response to a page switch operation triggering on the work presentation page, displaying a personal homepage of a target poster and displaying a position control on the personal homepage on the display of the electronic device, wherein the target poster is a poster of the target work, and the personal homepage is configured to display work items of works posted by the target poster; and
displaying a work item of the target work among the works posted by the target poster on the personal homepage in response to a first trigger operation triggering on the position control, wherein the position control keeps being displayed on the personal homepage before the work item of the target work is displayed, wherein the personal homepage displays the position control in response to not receiving a display cancel operation for the position control and not displaying the work item of the target work on the personal homepage; and
redisplaying the position control on the personal homepage after no longer displaying the work item of the target work and before displaying the work item of the target work again.

2. The method according to claim 1, further comprising:
canceling display of the position control on the personal homepage in response to the display cancel operation for the position control, wherein the display cancel operation comprises at least one of the first trigger operation or a second trigger operation, and the second trigger operation is a trigger operation triggering on any work item displayed on the personal homepage after the work item of the target work is displayed at least once.

3. The method according to claim 1, further comprising:
displaying a return control on the personal homepage when a preset display condition is met, wherein the return control is configured to trigger display of a work item of a preset work posted by the target poster.

4. The method according to claim 1, wherein displaying the work item of the target work on the personal homepage comprises:
acquiring display position information of the work item of the target work on the personal homepage, and displaying the work item of the target work on the personal homepage according to the display position information; or displaying the work item of the target work in a first preset position on the personal homepage.

5. The method according to claim 4, wherein, before displaying the work item of the target work on the personal homepage, the method further comprises:
determining that there is a work item which is not loaded between a current work item and the work item of the target work displayed on the personal homepage.

6. The method according to claim 5, wherein, after displaying the work item of the target work on the personal homepage, the method further comprises:
in response to a slide operation along a preset direction on the personal homepage, loading the work item which is not loaded, and displaying load prompt information in a second preset position on the personal homepage, wherein the load prompt information is configured to prompt that the work item which is not loaded is being loaded.

7. A display apparatus of a work, comprising:
at least one processor configured to function as;
a work presenting module, configured to present a target work on a work presentation page on the display apparatus;
a position control display module, configured to, in response to a page switch operation triggering on the work presentation page, display a personal homepage of a target poster, and display a position control on the personal homepage on the display of the electronic device, wherein the target poster is a poster of the target work, and the personal homepage is configured to display work items of works posted by the target poster; and
a work item display module, configured to display a work item of the target work among the works posted by the target poster on the personal homepage displayed on the display of the electronic device in response to a first trigger operation triggering on the position control, wherein the position control keeps being displayed on the personal homepage before the work item of the target work is displayed, wherein the personal homepage displays the position control in response to not receiving a display cancel operation for the position control and not displaying the work item of the target work on the personal homepage; and
the position control display module configured to redisplay the position control on the personal homepage on the display apparatus after no longer displaying the work item of the target work and before displaying the work item of the target work again.

8. An electronic device, comprising:
at least one processor; and
a memory in communicative connection with the at least one processor, wherein the memory stores a computer program that is capable of being executed by the at least one processor, and the computer program is executed by the at least one processor to cause the at least one processor to execute a display method of a work, wherein the display method of the work comprises:
presenting a target work on a work presentation page displayed on a display of the electronic device;
in response to a page switch operation triggering on the work presentation page, displaying a personal homepage of a target poster and displaying a position control on the personal homepage on the display of the electronic device, wherein the target poster is a poster of the target work, and the personal homepage is configured to display work items of works posted by the target poster; and
displaying a work item of the target work on the personal homepage in response to a first trigger operation triggering on the position control, wherein the position control keeps being displayed on the personal homepage before the work item of the target work is displayed, wherein the personal homepage displays the position control in response to not receiving a display cancel operation for the position control and not displaying the work item of the target work on the personal homepage; and
redisplaying the position control on the personal homepage after no longer displaying the work item of the target work and before displaying the work item of the target work again.

9. The electronic device according to claim 8, wherein the method further comprises:
canceling display of the position control on the personal homepage in response to the display cancel operation for the position control, wherein the display cancel operation comprises at least one of the first trigger operation or a second trigger operation, and the second trigger operation is a trigger operation triggering on any work item displayed on the personal homepage after the work item of the target work is displayed at least once.

10. The electronic device according to claim 8, wherein the method further comprises:
displaying a return control on the personal homepage when a preset display condition is met, wherein the return control is configured to trigger display of a work item of a preset work posted by the target poster.

11. The electronic device according to claim 8, wherein displaying the work item of the target work on the personal homepage comprises:
acquiring display position information of the work item of the target work on the personal homepage, and displaying the work item of the target work on the personal homepage according to the display position information; or
displaying the work item of the target work in a first preset position on the personal homepage.

12. The electronic device according to claim 11, wherein, before displaying the work item of the target work on the personal homepage, the method further comprises:
determining that there is a work item which is not loaded between a current work item and the work item of the target work displayed on the personal homepage.

13. The electronic device according to claim 12, wherein, after displaying the work item of the target work on the personal homepage, the method further comprises:
in response to a slide operation along a preset direction on the personal homepage, loading the work item which is not loaded, and displaying load prompt information in a second preset position on the personal homepage, wherein the load prompt information is configured to prompt that the work item which is not loaded is being loaded.

14. A non-transitory computer-readable storage medium, wherein the non-transitory computer-readable storage medium stores computer instructions, and the computer instructions, when executed by a processor, cause the processor to implement the display method of the work according to claim 1.

* * * * *